2,894,839

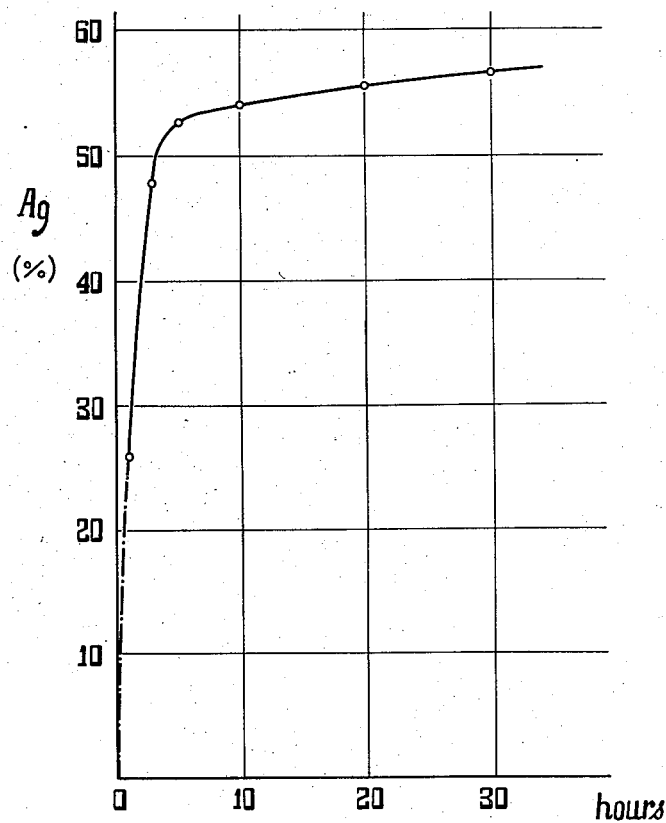

PROCESS FOR PRODUCING COMPOSITE POWDER OF SILVER AND CADMIUM OXIDE

Tatsuo Matsukawa, Shinmorikoji, Asahi-ku, Osaka, Japan

Application December 18, 1957, Serial No. 703,532

Claims priority, application Japan January 18, 1957

3 Claims. (Cl. 75—212)

This invention relates to processes for producing composite powder of silver and cadmium oxide, and more particularly to silver-cadmium oxide powder which can be used advantageously for manufacturing electric contact materials.

Composite materials comprising cadmium oxide and silver for manufacturing electric contacts are known.

This type of material has low electrical resistance, and a characteristic property of hardly being welded during use. It is therefore useful for direct current relays or circuit breakers of great capacity such as, for example, those of aeroplanes.

The following two methods are generally used for the preparation of material for electric contacts of the type mentioned above:

(a) Mixing silver powder and cadmium oxide powder, forming the mixture by pressing it into desired shape, and heating and sintering the formed material. (See "Treatise on Powder Metallurgy," by C. G. Goetzel, vol. III, p. 647, 1952.)

(b) Adding an aqueous solution of caustic soda to a mixture of aqueous solutions of silver salt and cadmium salt thereby producing a mixture of hydroxide of silver and hydroxide of cadmium, producing a mixed powder of silver and cadmium oxide by decomposition of the hydroxides of silver and cadmium by heating, forming said mixture by pressing, and heating and sintering the shaped material. (See page 650 of the book cited above.)

However, it is difficult to manufacture a product having uniform property according to process (a) due to the fact that the size and shape as well as the specific weight of silver powder are different from those of cadmium oxide powder and it is difficult to mix them uniformly to form a mixture of uniform composition. On the other hand, process (b) has disadvantages in that it requires much labor in washing, filtering and drying the material due to the fact that the hydroxides produced are in the form of a colloid.

One of the objects of the present invention is to provide cadmium oxide powder coated with silver and suitable for use in a silver-cadmium oxide material for electric contacts.

Another object of this invention is to provide an improved composite powder of silver and cadmium oxide wherein silver and cadmium oxide are uniformly distributed and intimately associated with each other.

Still another object of the present invention is to provide an improved composite powder of silver and cadmium oxide which can be easily handled in washing, filtering, drying and other operations.

A further object of this invention is to provide a process which is very economical in producing composite powder having the properties described above.

The objects of this invention as described above can be achieved by adding a powder of cadmium oxide to an aqueous solution of silver nitrate, coating the surface of the cadmium oxide powder with silver oxide and silver by stirring the mass frequently, separating the powder produced by filtration, and after washing with water and drying the powder, heating the powder from 300° C. to 500° C. to decompose silver oxide on the surface of the cadmium oxide powder to silver.

The inventor of the present invention has proposed before, in Japanese Patents Nos. 176,864 and 180,548, a process for producing tungsten powder coated with silver and graphite powder coated with silver by mixing zinc powder with tungsten powder or graphite powder, mixing and stirring them in an aqueous solution of copper sulphate, coating tungsten or graphite powder with copper, introducing said copper coated powder into an aqueous solution of silver nitrate and substituting silver for the copper.

However, in the case of cadmium oxide powder, coating with copper cannot be obtained even if zinc powder and aqueous solution of copper sulphate are used because of electrical non-conductivity of cadmium oxide. Accordingly the process of the patents mentioned above is not applicable to silver coating cadmium oxide.

The inventor has now discovered that when cadmium oxide is mixed in an aqueous solution of silver nitrate and is agitated to maintain the two compounds in contact, the cadmium oxide is gradually replaced by silver oxide from the surface and the surface of the powder is covered with silver oxide thereby changing the color of the surface to dark brown.

The reaction between cadmium oxide and an aqueous solution of silver nitrate is as follows:

$$CdO + 2AgNO_3 = Cd(NO_3)_2 + Ag_2O$$

This reaction proceeds effectively at room temperature. The relation between the amount of silver on the surface of powder and the time of contact is as shown on the figure and the amount of silver increases rapidly until the amount of silver reaches about 50%, but thereafter the increase rate is relatively slow. The cadmium oxide powder coated with silver oxide produced as above is separated by filtration, and after washing with water and drying, the powder is heated to 300–500° C. The silver oxide on the surface of the particles of powder is decomposed to silver by this heating and cadmium oxide coated with silver is obtained.

The inventor has also discovered that if the reaction between cadmium oxide powder and aqueous solution of silver nitrate is carried out under warm conditions, preferably at a temperature of from 60° C. to 90° C., at the beginning of the operation, silver oxide is produced to cover the surface of particles of the cadmium oxide powder. Subsequently an electric cell is formed in the aqueous solution of silver nitrate with silver oxide and cadmium oxide, thereby to dissolve cadmium oxide and a molecular equivalent of silver is precipitated to change the color of the surface of the powder to silver color.

In this treatment, the maximum amount of silver attainable is about 26–30% on the basis of the total weight of powder and no higher value beyond this limit can be attained.

The powder obtained by this treatment is covered with silver oxide and silver, and when it is washed with water, dried and heated at 300–500° C., the silver oxide on the surface is decomposed to silver and the powder of cadmium oxide will become coated with silver.

The amount of silver in the composite powder is varied according to the process, and is about 50% when produced by the process first described above and about 26–30% when produced by the process next described, while the content of cadmium oxide in the material used for electric contact materials of the type under discussion is generally 5–30%. Accordingly when electric contact materials are to be produced from the composite powders as described above, the material for electric contacts of required composition is prepared by supplementing the shortage of silver content by coating the powder with silver or admixing silver powder thereto, forming the silver supplemented powder into a desired shape by pressing, heating and sintering.

The present invention will be understood more clearly from the following description illustrating some embodiments of the invention for the purpose of illustration but not intended to limit the invention. It will be understood by those skilled in the art that the present invention may be modified or altered in many ways without departing from the scope and the spirit of the invention.

EXAMPLE 1

32 g. of cadmium oxide powder is added to 150 cc. of aqueous solution of silver nitrate containing 10 g. of silver, and is left at room temperature with occasional agitation for periods as indicated in Table I. Cadmium oxide powder coated with dark brown silver oxide is obtained. This powder is separated by filtration, washed with water, dried and heated again at 400° C. Cadmium oxide powder coated with silver of silver white color is obtained. The silver content of the produced powder is as described in Table I.

*Table I*

| Time of Contact (hour) | Silver Content in Composite Powder, Percent by Weight |
|---|---|
| 1 | 35.8 |
| 3 | 47.9 |
| 5 | 52.6 |
| 10 | 53.9 |
| 20 | 55.6 |
| 30 | 56.3 |

The results of this table are shown by the diagram of the figure.

EXAMPLE 2

32 g. of cadmium oxide is added to 150 cc. of aqueous solution of silver nitrate containing 10 g. of silver and agitated at elevated temperature of 80–90° C. Cadmium oxide coated with silver oxide and silver and exhibiting a white color is produced and precipitation is then filtered off, washed with water, dried and heated at 400° C. The powder obtained has 26.5% by weight of silver content.

The following is one example of a method for producing electric contact materials from the silver-cadmium oxide composite powder described above.

8.2 g. of the composite powder obtained by the above process and having the composition of 26.5% silver and 73.5% cadmium oxide is added to 1500 cc. of aqueous solution of silver nitrate containing 91.8 g. of silver and mixed 3000 cc. of aqueous solution containing 50 g. of sodium carbonate is added to the mixture while agitating, and produced composite powder and silver carbonate are filtered off, washed with water, dried and heated at 400° C. The silver carbonate is decomposed to silver. The mixture of the powder is pressed under a pressure of 3 t./cm.² and formed into a shape and heated and sintered at 800° C. The material produced is pressed again at a pressure of 4 t./cm.² and annealed at 750° C. The electric contact obtained has a composition of 6% cadmium oxide and the balance is silver.

The process of this example is of course also applicable to the composite material obtained by the process of Example 1. By examining the electric contact obtained by the process as described above, it has been found that it has the properties as described in the following:

|  | Cadmium oxide content, percent | Specific weight | Electric resistance, μΩ cm. | Hardness (Rockwell F Scale) | | Cross breaking strength, kg./mm.² |
|---|---|---|---|---|---|---|
|  |  |  |  | after pressing | after annealing |  |
| 1* | 9.79 | 9.61 | 2.06 | 76 | 51 | 32.4 |
| 2* | 10.08 | 9.55 | 2.24 | 65 | 45 | 39.3 |

In the above, 1* indicates the electric contact manufactured from the composite powder produced by the process of Example 1, and 2* indicates that made by the process of Example 2.

It will be unnecessary to say that potassium carbonate may be used in place of sodium carbonate in the process above described.

What is claimed is:

1. A process for producing silver-cadmium oxide powder suitable for manufacturing electric contact materials, said process comprising mixing cadmium oxide powder with an aqueous solution of silver nitrate, agitating the mixture until the surfaces of the cadmium oxide powder are coated with a substantial quantity of silver oxide which results from contact of the silver nitrate and cadmium oxide and which is deposited with any silver produced by contact of the solution of silver nitrate with the cadmium oxide and silver oxide, separating the particles of cadmium oxide coated with silver oxide by filtration, washing the separated particles with water, drying the washed particles and heating the dried particles to a temperature from about 300° C. to 500° C. thereby reducing the silver oxide to silver.

2. A process according to claim 1, wherein the mixture of cadmium oxide powder and aqueous solution of silver nitrate is maintained at room temperature under occasional agitation for a period sufficient to deposit silver of about 50% by weight on the basis of the total weight of the powder.

3. A process according to claim 1, wherein the mixture of cadmium oxide and aqueous solution of silver nitrate is maintained at a temperature of from 60° C. to 90° C. under occasional agitation for a period sufficient to deposit silver oxide and silver of a silver content in total of 26–30% by weight on the basis of the total weight of the powder.

References Cited in the file of this patent

UNITED STATES PATENTS

| 2,360,522 | Shobert | Oct. 17, 1944 |
| 2,545,438 | Stumboch | Mar. 20, 1951 |
| 2,729,559 | Matsukawa | Jan. 3, 1956 |